UNITED STATES PATENT OFFICE.

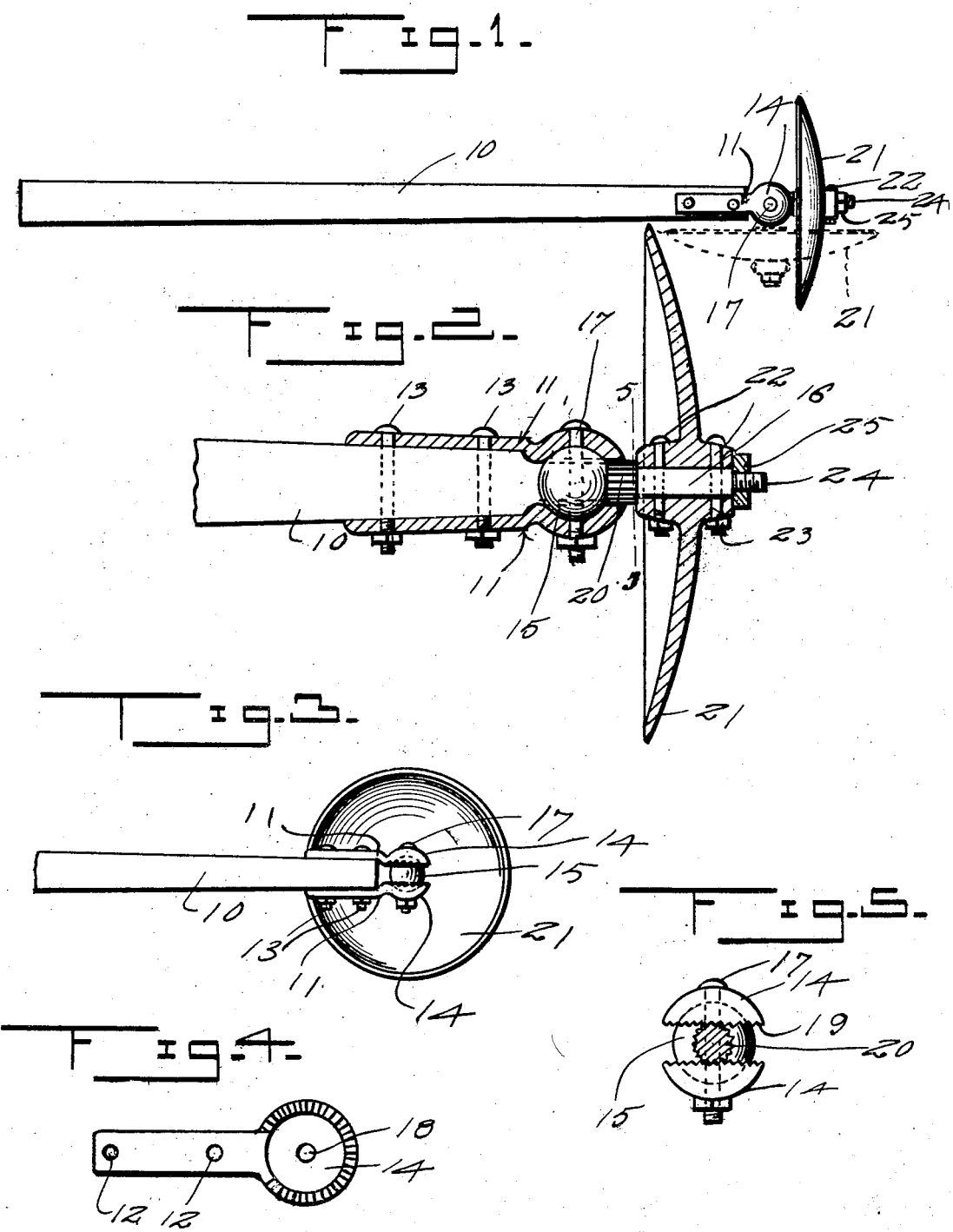

HERBERT V. CALKINS, OF LONGMONT, COLORADO.

AGRICULTURAL IMPLEMENT.

1,328,124.                Specification of Letters Patent.      Patented Jan. 13, 1920.

Application filed August 28, 1918. Serial No. 251,783.

*To all whom it may concern:*

Be it known that I, HERBERT VICTOR CALKINS, a citizen of the United States, residing at Longmont, in the county of Boulder and State of Colorado, have invented certain new and useful Improvements in Agricultural Implements; and I do hereby declare the following to be a full, clear, and exact description of the invention, such as will enable others skilled in the art to which it appertains to make and use the same.

My invention relates to improvements in agricultural implements, and more particularly to an adjustable disk hoe.

An important object of this invention is to provide a tool of the character described having an adjustable concavo-convex working disk or blade adapted to be adjusted for performing different functions in the garden.

A further object of the invention is to provide a tool of the character described, having simple and reliable adjusting means connecting the working disk with the handle of the tool.

A further object of the invention is to provide a device of the character described, which is of highly simplified construction, desirable in use and cheap to manufacture.

Other objects and advantages of the invention will be apparent during the course of the following description.

In the accompanying drawing forming a part of this specification, and in which like numerals are employed to designate like parts throughout the same, Figure 1 is a side elevation of an agricultural implement embodied in my invention, Fig. 2 is a fragmentary side elevation of the same, the view being taken at right angles to the view shown in Fig. 1 and the parts thereof being shown in section.

Fig. 3 is a side elevation of the forward portion of the tool, showing the working disk arranged at one side of the handle, Fig. 4 is a side elevation of a clip embodied in the invention, and Fig. 5 is a section taken on the line 5—5 of Fig. 2.

In the drawing, wherein for the purpose of illustration is shown the preferred embodiment of my invention, the numeral 10 generically designates a handle, which in manufacture may be of wood and of the usual shape. Secured to the forward portion of the handle 10 and on opposite sides thereof is a pair of clips 11, having apertures 12 adapted for the reception of bolts 13. As clearly shown in Fig. 2, the bolts 13 are adapted to extend through the forward portion of the handle 10 and secure the clips 11 thereto. The forward portions of the clips 11 are provided with concavo-convex engaging arms 14, said arms having their concaved faces opposed. The arms 14 form a socket adapted for the reception of a ball 15, having a shaft 16 extending therefrom. A pivot element and bolt 17 extends through centrally disposed apertures 18 in the arms 14 and through a radial opening through the ball 15. The opposed edges of the arms 14 are provided with teeth 19 adapted for engagement with the shank portions 20 of the shaft 16. As clearly shown in Figs. 2 and 5, the shank portion 20 of the shaft 16 is provided with peripheral teeth and is adapted to be positioned at any point about the arms 14. A concavo-convex working disk or blade 21 is arranged on the shaft 16, and is secured thereto by bolts 22, having threaded engagement with retaining nuts 23.

The forward end portion of the shaft 16 is provided with screw threads 24, having engagement with a retaining nut 25 for rigidly securing the concavo-convex working disk on the shaft 16. The bolt 17 limits the ground working apparatus to adjustment about a vertical axis and prevents accidental movement of the member 21 about a horizontal axis.

In the use of my improved tool, it will be apparent that the working disk, or blade 21, may be adjusted in any desired position with respect to the handle 10. In working about plants and the like, it will be apparent that the lower portion of the disk may be inserted within the ground without the danger of cutting the upper portion of the plant.

In the manufacture of my improved tool, the metal parts thereof are to be made of a light high grade steel, thus insuring a very light weight tool.

While I have shown and described the preferred embodiment of my invention, it is understood that I may make such minor changes in arrangement and construction of parts as will remain within the spirit of the invention and the scope of the appended claims.

Having thus described my invention, what I claim is:

1. A tool of the class described comprising a handle, a pair of clips secured to the forward portion of the handle and having their forward end portions shaped to form a socket, a shaft having a ball head arranged within said socket, a pivot element extending through the portions of the clips forming the socket and through said ball head, and a ground working blade carried by said shaft and adapted to be positioned about said pivot element.

2. A tool of the class described including a handle, a pair of clips secured to the handle and having their forward end portions projecting beyond the handle and shaped to form a socket, the portions of said clips which form the socket being provided on their opposed edges with teeth, a shaft having a ball head arranged in said socket, circumferential teeth provided on the shaft and engaged by the teeth of said clips, a pivot element extending through said clips and the ball head of the shaft, and a ground working blade carried by said shaft and adapted to be positioned about said pivot element.

3. A device of the class described including a handle, a pair of clips secured to the handle and having their forward end portions spaced and provided with teeth on their opposed sides, a ground working apparatus, a shaft secured to the ground working apparatus and having a head arranged between the extended portion of said clips and provided with circumferential teeth engaging the teeth of said clips, and a combined bolt and pivot element passing through said head and the adjacent portions of said clips.

4. A tool of the class described including a handle, a pair of clips secured to the handle and having their forward end portions spaced and extending beyond the handle, a shaft having a head arranged between the extended portions of the clips, a ground working device secured to said shaft, and a combined bolt and pivot element extended through said head and the adjacent portions of said clips, said ground working device being adapted to be adjusted about said pivot elements.

In testimony whereof I affix my signature in presence of two witnesses.

HERBERT V. CALKINS.

Witnesses:
C. P. JENSEN,
CHAS. MANTOR.